Aug. 19, 1930.   C. LE BLEU   1,773,536
POWER TILTING DEVICE FOR SCRAPERS
Filed Oct. 25, 1929   2 Sheets-Sheet 1
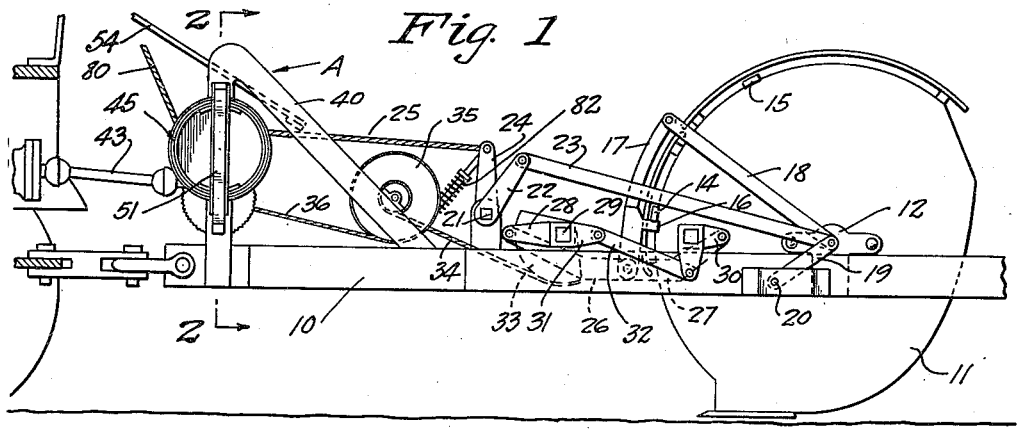
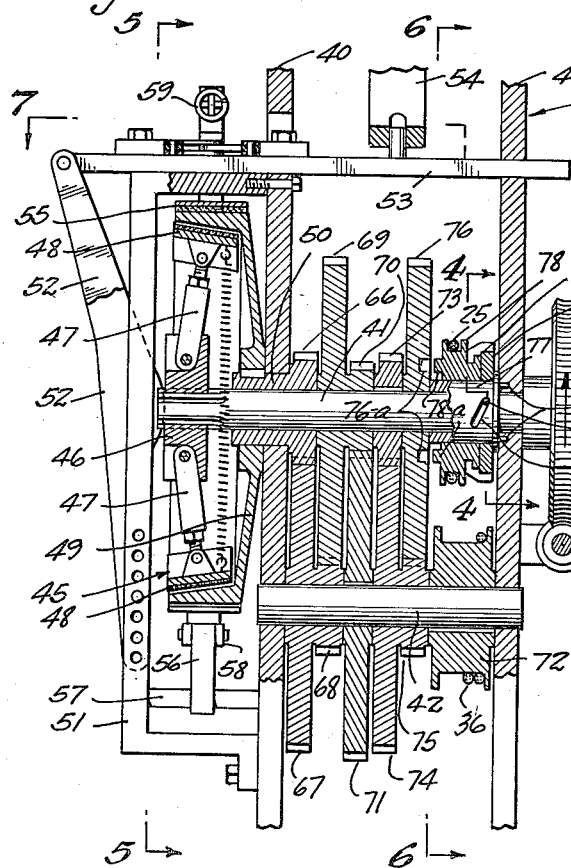
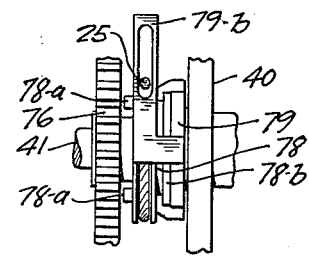
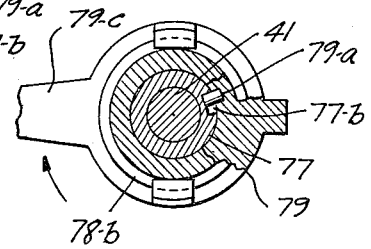
INVENTOR
Charles Le Bleu
BY
Westall and Wallace
ATTORNEYS Aug. 19, 1930.  C. LE BLEU  1,773,536
POWER TILTING DEVICE FOR SCRAPERS
Filed Oct. 25, 1929  2 Sheets-Sheet 2
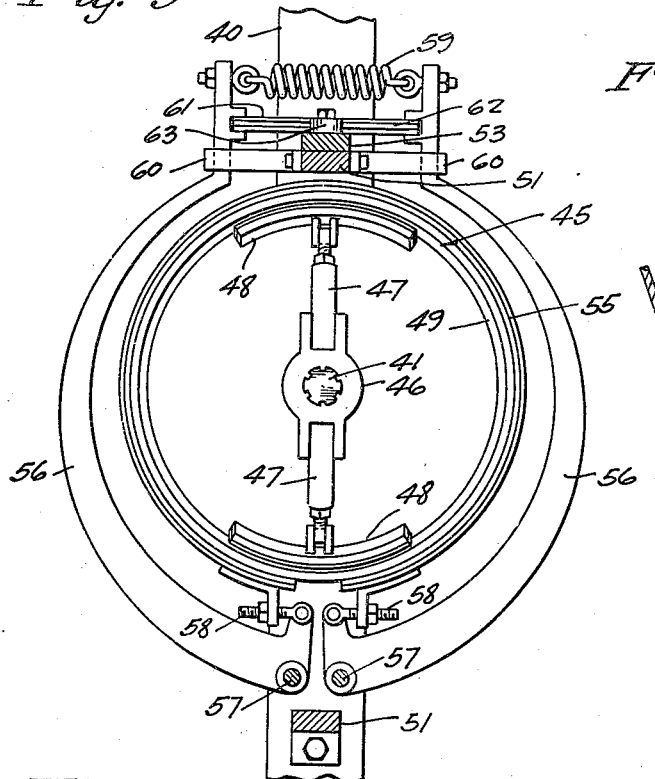
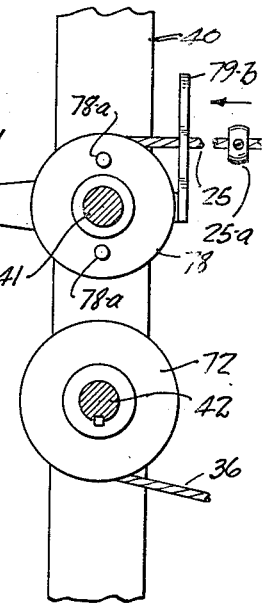
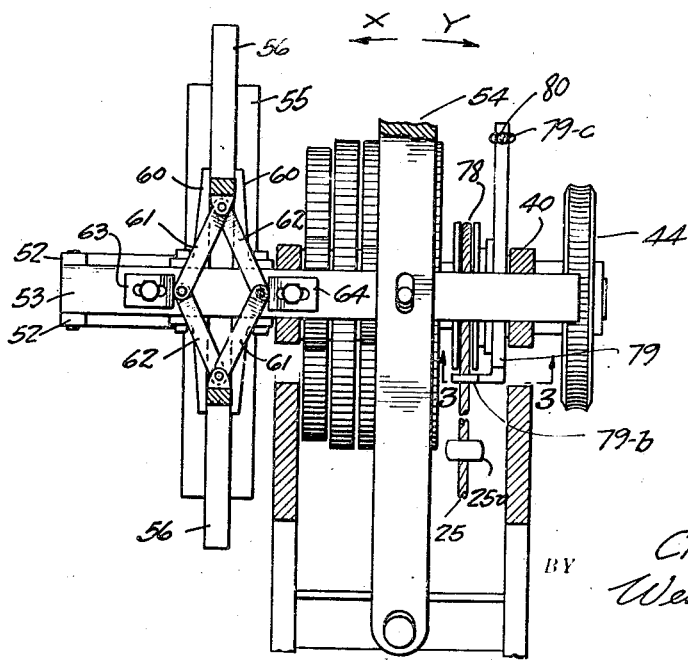
INVENTOR
Charles Le Bleu
BY Westall and Wallace
ATTORNEYS Patented Aug. 19, 1930

1,773,536

UNITED STATES PATENT OFFICE

CHARLES LE BLEU, OF LOS ANGELES, CALIFORNIA

POWER TILTING DEVICE FOR SCRAPERS

Application filed October 25, 1929. Serial No. 402,348.

This invention relates to a control device for use with revolving scrapers. Such scrapers have a scoop or bowl mounted in a frame so as to be rotatable about a horizontal axis, the rotation of the scoop commonly being caused by the engagement of its edge with the surface over which the scoop is being drawn. Such scrapers have been provided with a detent carried by the frame adapted to engage one of several abutment teeth on the scoop positioned to hold the scoop in loading, dumping or riding or idling position. An improvement in this type of scraper in which mechanism is added so that the bowl can be raised from and lowered to the digging position as often as desired without dumping until a full load is obtained, is shown and described in my application Ser. No. 366,960, filed May 29, 1929. The entire pull of the traction means dragging the scraper is exerted in tending to make the bowl revolve and is resisted by the detent and operating mechanism on the frame. Obviously the pressure on these parts will be very large, and various linkages have been resorted to in order to make it possible for the operator of the tractor to move this detent under such pressure.

It is a principal object of this invention to provide a device for controlling the operation of the scraper, in which the power for actuating the detent operating mechanism may be obtained from a prime mover such as the tractor. Other objects are the provision of such a device which is readily manipulated by the operator, and which is strong, durable and reliable.

These objects together with other objects and corresponding accomplishments are obtained by means of the embodiment of my invention illustrated in the accompanying drawing in which:—

Fig. 1 is a side elevation of a revolving scraper attached to the rear of a tractor and equipped with my power control device; Fig. 2 is a cross-section as seen on line 2—2 of Fig. 1; Fig. 3 is a cross-section as seen on line 3—3 of Fig. 7; Figs. 4, 5, 6 and 7 are cross-sections as seen on the correspondingly numbered lines of Fig. 2.

Referring with more particularity to the drawings and especially Fig. 1, the frame of a revolving wheeled scraper is denoted by 10, the rear part of the frame to which the wheels are attached not being shown. The frame comprises bars, one at each side, between which the scoop or bowl 11 is rotatably supported on trunnions 12. Teeth or abutments 14 and 15 are attached to the bowl and may be engaged by a detent 16 formed on lever 17 and arranged to be disposed in the path of the abutments. Lever 17 is pinned at its upper end to a link 18, which is pinned to link 19, and the latter is pivotally secured to the frame 10 by a pin 20. A shaft 21 extends across and is journalled on the frame and has a crank lever 22 at each end with a link 23 pinned to the knuckle of links 18 and 19. A lever 24 mounted in the middle of shaft 21 is connected by cable 25 to the power control device, generally indicated by A. The arrangement is such that when lever 24 is pulled forward, link 19 will be swung about pin 20, and by means of link 18 will swing lever 17 about its lower pin, bringing detent 16 out of the path of engagement with abutment teeth 14 and 15. This will permit the bowl to be revolved.

The lower end of lever 17 is pinned to links 26 and 27 at their knuckle. Link 26 is connected to a crank lever 28, there being one of these levers at each end of a shaft 29 extending across the frame. Link 27 is connected to one arm of a bell crank 30 pivoted on the frame and connected to a lever 31 on shaft 29 by a link 32. A sheave quadrant 33 is secured to the central part of shaft 29 and is connected by a cable 34 to the smaller of a pair of reels 35; the larger of these is connected by cable 36 to the power control device A. This arrangement is such that when cable 36 is released, shaft 29 may be turned a part of a revolution in a counterclockwise direction and bell crank 30 in the opposite direction to enable links 26 and 27 to be buckled about their connection. This, due to the pressure of the bowl abutment tooth 14 on detent 16 causes the knuckle connection of links 26 and 27 to be moved downward thereby lowering lever 17 with detent 16 and allowing the bowl to swing into digging position. If a pull is exerted on the cable 36, the parts will be returned to their initial position and the bowl raised as shown in the drawing, detent 16 lifting abutment 14.

The control mechanism A comprises a frame formed of a pair of side members 40 and is preferably mounted on the forward end of the scraper frame 10. A main shaft 41 and a countershaft 42 are journalled in this frame. The main shaft is arranged to be driven by the tractor motor in any convenient manner, as by a shaft 43 connected to the drive shaft of the tractor and worm gearing 44. A combined clutch and brake mechanism 45 is mounted at one end of the main shaft. The clutch consists of a driving block 46 splined to shaft 41 and slidable thereon and having a pair of arms 47 pinned to it. Arms 47 are adjustable as to length and each has a shoe 48 secured to its outer end. A driven member or drum 49 is adapted to be engaged by these shoes and is keyed to a sleeve 50 journalled in the frame, and forming a journal for shaft 41. Frame 40 has an extension 51, to which is pivoted a pair of clutch operating levers 52 arranged to be swung by reciprocating a bar 53 slidably mounted in frame 40, the operating levers being connected at their upper ends to bar 53. When levers 52 are swung to the right (Fig. 2) block 46 slides on shaft 41 and shoes 48 are forced in engagement with drum 49 by the toggle action of levers 47. An operating lever 54 is pivotally secured to the frame and connected to bar 53. It extends to within easy reach of the operator and enables him to reciprocate bar 53.

Embracing the outside of the drum 49 is a brake band 55, which may be contracted by movement of a pair of bell cranks 56 supported on pins 57 and adjustably connected to the ends of the brake band by threaded clevises 58. The upper ends of the bell cranks are connected by a tension spring 59, which normally urges the arms together and contracts the band (see Fig. 5). They are maintained in correct horizontal position by guides 60 secured to the frame. Pinned to the bell crank arms 56 and supported on bar 53 are toggle arms 61 and 62, stops 63 and 64 for actuating them being adjustably secured to bar 53 (see Fig. 7). When bar 53 is moved to either right or left, one of these stops will be engaged by and flatten the adjacent toggle and spread the bell cranks against the tension of spring 59 so as to release the brake.

Sleeve 50 is formed with a pinion 66 on one end which drives a double gear comprising a gear 67 and a second pinion 68, the double gear being rotatably mounted on the countershaft 42. Pinion 68 drives a second double gear comprising a gear 69 and its companion a third pinion 70, rotatably mounted on the main shaft. Pinion 70 drives a third gear 71, keyed to the countershaft 42. A reel 72 is also keyed to shaft 42 and has cable 36 secured to it. Thus, rotation of the drum 49 will produce movement of cable 36 through the step down transmission. A fourth pinion 73 is keyed to shaft 41, and drives a gear 74 and pinion 75, rotatably mounted on shaft 42. Pinion 75 drives a gear 76 rotatably mounted on shaft 41 and provided with recesses 76$^a$ in its side face. A bushing 77 is mounted on shaft 41 between gear 76 and frame 40 and is prevented from turning by pins 77$^a$ engaging the frame. Bushing 77 has a diagonal slot 77$^b$ in its surface. Slidably and rotatably mounted on this bushing is a reel 78 to which is attached cable 25. Reel 78 is provided with pins 78$^a$ adapted to engage recesses 76$^a$ and on its opposite side has a flange 78$^b$ engaged by fingers on a collar 79. Collar 79 is also slidably and rotatably mounted on bushing 77 and has a pin 79$^a$ engaging slot 77$^b$, an upstanding slotted arm 79$^b$ through which cable 25 passes and a forwardly extending arm 79$^c$ to which is attached a cable 80. Cable 80 extends to within convenient reach of the operator and when it is pulled upwardly collar 79 is turned and moved to the left (Fig. 2) due to the movement of pin 79$^a$ in slot 77$^b$. This brings the pins on reel 78 into engagement with the recesses in gear 76, which causes it to be rotated and pull in cable 25. Cable 25 has a stop 25$^a$ adjustably secured to it (Fig. 6) which engages the slotted arm after the desired movement has occurred and returns collar 79 to its initial position and disengages the reel, after which spring 82 returns lever 24 and connected parts to their initial position.

The mechanism operates in the following manner: All parts being in the relative positions as shown in the drawings, the tractor is moved forward. When it is desired to begin scraping lever 54 is moved to the left (in the direction of arrow $x$, Fig. 7) by the operator. This releases the brake 55 and allows cable 36 to unwind from reel 72 which by means of the levers and connections previously described lowers lever 17 and causes the blade of the bowl to dig and be dragged down into the ground. When it reaches the required depth, the lever 54 is returned to mid-position, allowing the brake to set and hold all parts in that position causing the scoop to scrape to that depth. When it is desired to raise the scoop and stop digging, the lever 54 is shifted to the right (in the direction of arrow Y, Fig. 7). This again releases the brake and simultaneously engages the clutch, causing reel 72 to wind up cable 36 and return lever 17 to its initial position raising the blade out of the ground. This may be repeated as often as desired, until the bowl is loaded.

When it is desired to dump the load, rope 80 is pulled causing reel 78 to be rotated and in turn to wind and pull cable 25. This swings detent 16 out of engagement with stop 14 permitting the bowl to rotate until stop 15 engages the detent, which has been returned to its initial position by spring 82 when reel 78 is disengaged, as previously explained. When it is desired to return the scoop to its initial position, detent 16 is again swung, this time out of engagement with stop 15, and the drag of the scoop on the surface of the ground will rotate it to its initial position, with tooth 14 engaged by the detent.

What I claim is:—

1. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising a lever arm having said detent thereon, said arm being swingable to position said detent in or out of the path of said abutment, a toggle joint to the elbow of which said lever arm is pivotally connected whereby said lever arm and detent may be moved longitudinally with said abutment and said arm may be swung, means to selectively restrain said arm from swinging so as to maintain said detent in the path of said abutment or to swing said arm and said detent to position in or out of said path, and means to selectively buckle said toggle joint so as to move said arm with said abutment.

2. In a scraper, the combination of a frame, a scraper bowl rotatably mounted thereon and having abutments spaced arcuately in relation to the axis of rotation of said bowl, a detent carried by said frame and engageable with said abutments to limit the rotation and angular position of said bowl; a mechanical movement supporting said detent on said frame comprising a lever arm having said detent thereon, said arm being swingable to position said detent in or out of the path of said abutments, a toggle joint to the elbow of which said lever arm is pivotally connected whereby said lever arm and detent may be moved with said abutments and said arm may be swung, means to selectively restrain said arm from swinging so as to maintain said detent in the path of said abutments or to swing said arm and said detent to position in or out of said path, and means to selectively buckle said toggle joint so as to move longitudinally said arm with said abutment.

3. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising an arm having said detent thereon, said arm being movable longitudinally for a limited distance in the path of and with said abutment and movable to position said detent in or out of said path; mechanism to selectively move said arm and said detent in the path of and with said abutment and to selectively move said arm and said detent in or out of the path of said abutment; and a control disposed intermediate said mechanism adapted to be connected to a prime mover and operable to transmit power to selectively withdraw said detent from the path of said abutment, to move said detent with said abutment, or to maintain said detent stationary in a selected position.

4. In a scraper, the combination of a frame, a scraper bowl rotatably mounted thereon and having abutments spaced arcuately in relation to the axis of rotation of said bowl, a detent carried by said frame and engageable with either of said abutments to limit the rotation and angular position of said bowl; a mechanical movement supporting said detent on said frame comprising an arm having said detent thereon, said arm being movable longitudinally for a limited distance in the path of and with said abutments and movable to position said detent in or out of said path; mechanism to selectively move said arm and said detent in the path of and with said abutments and to selectively move said arm and said detent in or out of the path of said abutments; and a control adapted to be connected to a prime mover and operable to transmit power to selectively withdraw said detent from the path of said abutments, to move said detent with said abutments, or to maintain said detent stationary in a selected position.

5. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising an arm having said detent thereon, said arm being movable longitudinally for a limited distance in the path of and with said abutment and movable to position said detent in or out of said path; a control adapted to be connected to a prime mover comprising a gear set, a reel mechanism having cable connected to said mechanical movement to enable longitudinal movement of said arm, a clutch to selectively clutch or declutch the prime mover and said gear set, other reel mechanism having cable connected to said arm to enable swinging of the latter, and clutch means to clutch or declutch said other reel mechanism and said gear set.

6. In a scraper, the combination of a frame, a scraper bowl rotatably mounted thereon and having abutments spaced arcuately in relation to the axis of rotation of said bowl, a detent carried by said frame and engageable with either of said abutments to limit the rotation and angular position of said bowl; a mechanical movement supporting said detent on said frame comprising an arm having said detent thereon, said arm being movable longitudinally for a limited distance in the path of and with said abutments and movable to position said detent in or out of said path; a control adapted to be connected to a prime mover comprising a gear set, a reel mechanism having cable connected to said mechanical movement to enable longitudinal movement of said arm, a clutch to selectively clutch or declutch said prime mover and said gear set, other reel mechanism having cable connected to said arm to enable swinging of the latter, and clutch means to clutch or declutch said other reel mechanism and said gear set.

7. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising an arm having said detent thereon, said arm being movable longitudinally for a limited distance in the path of and with said abutment and movable to position said detent in or out of said path; control adapted to be connected to a prime mover comprising a gear set, a reel mechanism having cable connected to said mechanical movement to enable longitudinal movement of said arm, a clutch to selectively clutch or declutch the prime mover and said gear set, other reel mechanism having cable connected to said arm to enable swinging of the latter, clutch means to clutch or declutch said other reel mechanism and said gear set, a brake for said clutch, means tending to hold said brake in braking position, operating means for said clutch and brake to release said brake in either clutching or extreme declutching position.

8. In a scraper, the combination of a frame, a scraper bowl rotatably mounted thereon and having abutments spaced arcuately in relation to the axis of rotation of said bowl, a detent carried by said frame and engageable with either of said abutments to limit the rotation and angular position of said bowl; a mechanical movement supporting said detent on said frame comprising an arm having said detent thereon, said arm being movable longitudinally for a limited distance in the path of and with said abutments and movable to position said detent in or out of said path; a control adapted to be connected to a prime mover comprising a gear set, a reel mechanism having cable connected to said mechanical movement to enable longitudinal movement of said arm, a clutch to selectively clutch or declutch said prime mover and said gear set, other reel mechanism having cable connected to said arm to enable swinging of the latter, clutch means to clutch or declutch said other reel mechanism and said gear set, a brake for said clutch, means tending to hold said brake in braking position, operating means for said clutch and brake to release said brake in either clutching or extreme declutching position.

9. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising a lever arm having said detent thereon, said arm being swingable to position said detent in or out of the path of said abutment, a toggle joint to the elbow of which said lever arm is pivotally connected whereby said lever arm and abutment may be moved longitudinally with said abutment and said arm may be swung, means to selectively restrain said arm from swinging so as to maintain said detent in the path of said abutment or to swing said arm and said detent to position in or out of said path; a control adapted to be connected to a prime mover comprising a gear set, a reel mechanism having cable connected to said toggle joint, means to actuate the latter and move said arm longitudinally, a clutch to selectively clutch or declutch the prime mover and gear set, other reel mechanism having cable connected to said arm to enable swinging of the latter, and clutch mechanism to clutch or declutch said other reel mechanism and said gear set.

10. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising a lever arm having said detent thereon, said arm being swingable to position said detent in or out of the path of said abutment, a toggle joint to the elbow of which said lever arm is pivotally connected whereby said lever arm and abutment may be moved longitudinally with said abutment and said arm may be swung, means to selectively restrain said arm from swinging so as to maintain said detent in the path of said abutment or to swing said arm and said detent to position in or out of said path; a control adapted to be connected to a prime mover comprising a gear set, a reel mechanism having cable connected to said toggle joint means to actuate the latter and move said arm longitudinally, a clutch to selectively clutch or declutch the prime mover and gear set, other reel mechanism having cable connected to said arm to enable swinging of the latter, clutch mechanism to clutch or declutch said other reel mechanism and said gear set, a brake for said clutch, means tending to hold said brake in braking position, and operating means for said clutch and brake to release said brake in either clutching or extreme declutching position.

11. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising a lever arm having said detent thereon, said arm being swingable to position said detent in or out of the path of said abutment, a toggle joint to the elbow of which said lever arm is pivotally connected whereby said lever arm and abutment may be moved longitudinally with said abutment and said arm may be swung, means to selectively restrain said arm from swinging so as to maintain said detent in the path of said abutment or to swing said arm and said detent to position in or out of said path; a control adapted to be connected to a prime mover comprising a gear set, a reel mechanism cable on said reel mechanism connected to said toggle joint means to actuate the latter and move said arm longitudinally, a clutch to selectively clutch or declutch the prime mover and gear set, a reel, a cable on said reel connected to said arm to enable swinging of the latter, clutch mechanism to clutch or declutch said reel and means on the second cable to declutch said clutch mechanism.

12. In a scraper, the combination of a frame, a scraper bowl rotatably mounted thereon and having an abutment, a detent carried by said frame and engageable with the abutment on said bowl to limit the rotation and angular position of the latter; a mechanical movement supporting said detent on said frame comprising a lever arm having said detent thereon, said arm being swingable to position said detent in or out of the path of said abutment, a toggle joint to the elbow of which said lever arm is pivotally connected whereby said lever arm and abutment may be moved longitudinally with said abutment and said arm may be swung, means to selectively restrain said arm from swinging so as to maintain said detent in the path of said abutment or to swing said arm and said detent to position in or out of said path; a control adapted to be connected to a prime mover comprising a gear set, a reel mechanism cable on said reel mechanism connected to said toggle joint means to actuate the latter and move said arm longitudinally, a clutch to selectively clutch or declutch the prime mover and gear set, a reel, a cable on said reel connected to said arm to enable swinging of the latter, clutch mechanism to clutch or declutch said reel and said gear set, a brake for said clutch, means tending to hold said brake in braking position, operating means for said clutch and brake to release said brake in either clutching or extreme declutching position, and means on the second cable to clutch or declutch said clutch mechanism.

In witness that I claim the foregoing I have hereunto subscribed my name this 14th day of October, 1929.

CHARLES LE BLEU.